United States Patent
McClain et al.

(10) Patent No.: US 10,099,724 B2
(45) Date of Patent: Oct. 16, 2018

(54) ROAD DEPARTURE PROTECTION SYSTEM

(71) Applicant: Continental Automotive Systems, Inc., Auburn Hills, MI (US)

(72) Inventors: Jeremy J McClain, Oxford, MI (US); Dominik Froehlich, Royal Oak, MI (US); David Leslie Agnew, Clarkston, MI (US); Ibro Muharemovic, Shelby Township, MI (US); Graham Lanier Fletcher, Royal Oak, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 14/601,752

(22) Filed: Jan. 21, 2015

(65) Prior Publication Data
US 2015/0203109 A1    Jul. 23, 2015

Related U.S. Application Data

(60) Provisional application No. 61/929,778, filed on Jan. 21, 2014, provisional application No. 61/950,962, filed on Mar. 11, 2014.

(51) Int. Cl.
*B62D 11/00* (2006.01)
*B62D 15/02* (2006.01)
(Continued)

(52) U.S. Cl.
CPC ........ *B62D 15/025* (2013.01); *B60T 8/17557* (2013.01); *B60W 30/12* (2013.01);
(Continued)

(58) Field of Classification Search
CPC .... B60T 8/17557; B60W 30/12; B62D 7/159; B62D 15/025
(Continued)

(56) References Cited

U.S. PATENT DOCUMENTS

2008/0091318 A1*  4/2008  Deng .................... B62D 6/003
                                                            701/41
2010/0079590 A1*  4/2010  Kuehnle ............ G06K 9/00798
                                                            348/118
(Continued)

FOREIGN PATENT DOCUMENTS

CN       102639387 A      8/2012
DE    10201015538 A1    10/2011
(Continued)

OTHER PUBLICATIONS

PCT/US2015/012449 International Search Report and the Written Opinion of the International Searching Authority dated Jul. 1, 2015.
(Continued)

*Primary Examiner* — Muhammad Shafi
(74) *Attorney, Agent, or Firm* — Matthew Binkowski

(57) ABSTRACT

A safety system for a vehicle providing a road departure protection feature comprises a camera, mounted to the vehicle to provide a view of a driving direction of the vehicle, and an electronic control unit connected to the camera. The electronic control unit includes instructions for analyzing the image and comparing the roadway path to the predicted vehicle path. The electronic control unit determines a vehicle roadway departure is occurring when the predicted vehicle path differs from the roadway path by a predetermined threshold, and then determines at least one corrective action to return the vehicle path to the roadway path. The safety system sends instructions to apply at least one corrective action with at least an electronic stability control system.

4 Claims, 3 Drawing Sheets

(51) Int. Cl.
  *B60T 8/1755* (2006.01)
  *B60W 30/12* (2006.01)
  *B62D 7/15* (2006.01)

(52) U.S. Cl.
  CPC .......... *B62D 7/159* (2013.01); *B60T 2201/08* (2013.01); *B60W 2420/42* (2013.01); *B60W 2420/52* (2013.01); *B60W 2550/402* (2013.01)

(58) Field of Classification Search
  USPC ...... 703/41, 400–541; 340/988–996; 701/41, 701/400–541
  See application file for complete search history.

(56) References Cited

U.S. PATENT DOCUMENTS

| | | | | |
|---|---|---|---|---|
| 2012/0288154 | A1* | 11/2012 | Shima | G08G 1/167 382/103 |
| 2013/0190985 | A1* | 7/2013 | Nakano | B62D 6/00 701/41 |

FOREIGN PATENT DOCUMENTS

| | | | |
|---|---|---|---|
| DE | 102010060300 A1 | | 5/2012 |
| JP | 2008213745 A | | 9/2008 |
| JP | 2010202048 A | | 9/2010 |
| JP | 2011028659 A | | 2/2011 |
| JP | 2011517632 A | | 6/2011 |
| JP | 2013512140 A | | 4/2013 |
| JP | H4300781 A | | 4/2013 |
| JP | 2013173520 A | | 9/2013 |
| KR | 2003-0063082 | * | 9/2003 |
| KR | 100851120 B1 | | 8/2008 |
| WO | WO-2013-120546 | * | 8/2013 |

OTHER PUBLICATIONS

DE 10 2010 015538 A1 English Machine Translation—Google Patents.
DE 10 2010 060300 A1 English Machine Translation—Google Patents.
Japanese Office Action dated Nov. 6, 2017, for corresponding Japanese application No. 2016-547918.
Chinese Office Action dated Jan. 30, 2018, for corresponding Chinese appliction No. 201580005304.
Japanese Office Action dated Jul. 2, 2018 for corresponding Japanese application No. 2016-547918.

\* cited by examiner

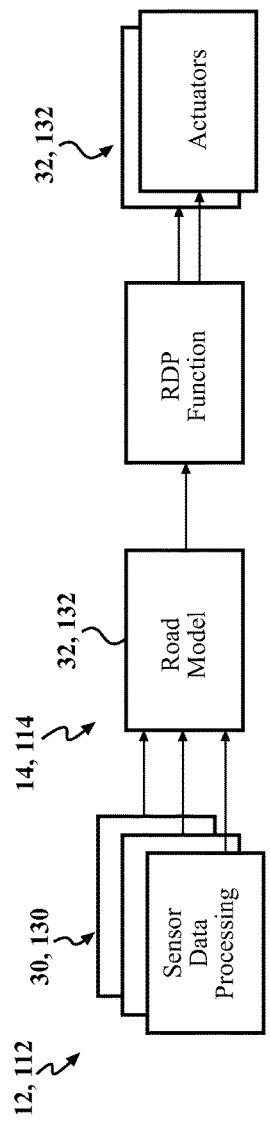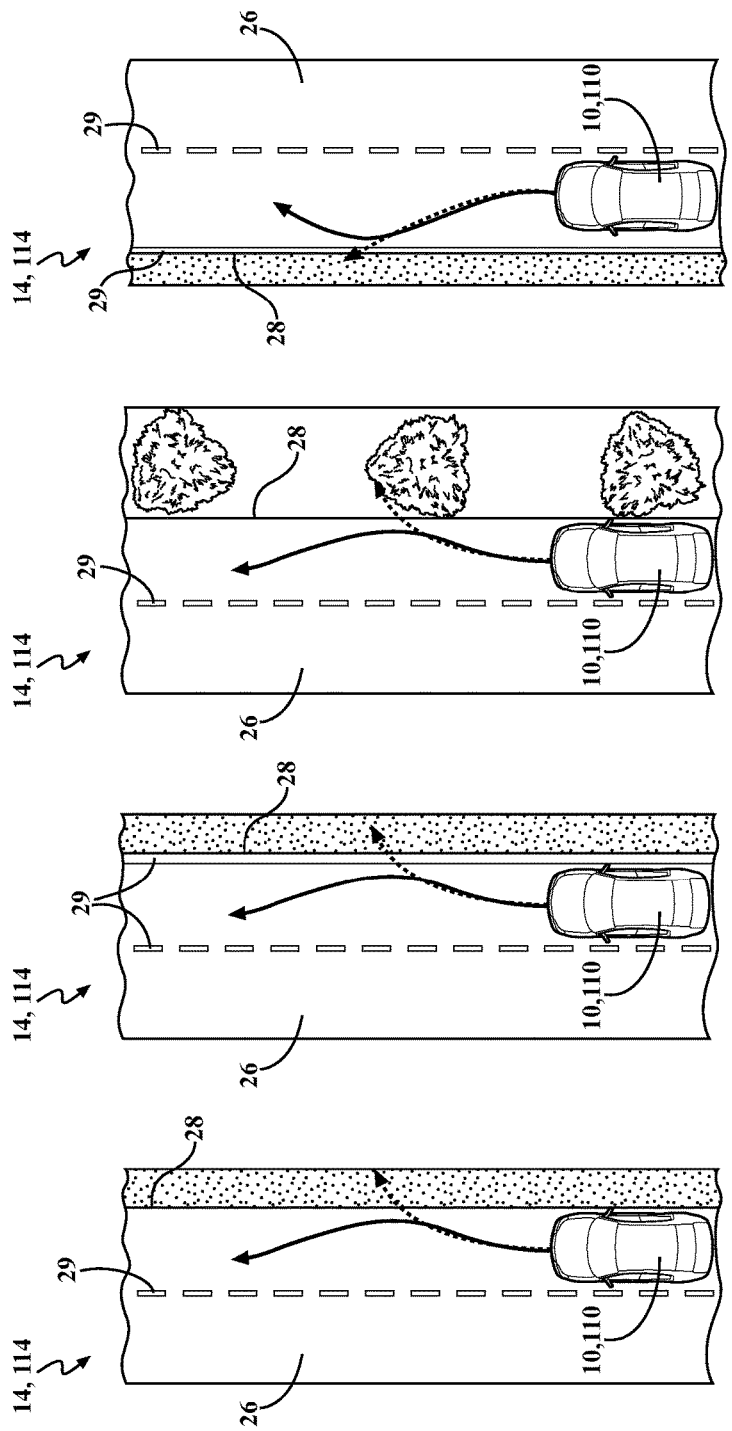

ROAD DEPARTURE PROTECTION SYSTEM

CROSS-REFERENCE TO RELATED APPLICATIONS

This disclosure claims priority to U.S. Provisional Application No. 61/929,778, which was filed on Jan. 21, 2014 and U.S. Provisional Application No. 61/950,962, which was filed on Mar. 11, 2014, which are incorporated herein by reference.

TECHNICAL FIELD

The present disclosure relates to automotive vehicles and more particularly to safety systems for automotive vehicles.

BACKGROUND

Lane departure protection and lane keeping systems found in production today perform similar tasks of keeping a vehicle in its lane. However such systems are focused specifically on the driving lane and not the roadway. These systems require visible lines on the roadway which are often not available. The systems are also prone to false activations in common scenarios, i.e. when the driver intentionally crosses over a lane marker without using turn indicator. These systems typically have limited intervention authority and are only intended as assistance functions.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A safety system for a vehicle providing a roadway departure protection feature comprises a camera, mounted to the vehicle to provide a view of a driving direction of the vehicle, and an electronic control unit (ECU) connected to the camera, which includes instructions for analyzing the camera image and comparing the roadway path to the predicted vehicle path. The ECU determines a vehicle roadway departure is occurring when the predicted vehicle path differs from the roadway path by a predetermined threshold and determines at least one corrective action to return the vehicle path to the roadway path. The safety system sends instructions to apply at least one corrective action with at least an electronic stability control system.

A method of preventing roadway departure for vehicle comprises analyzing an image from a camera, which provides a view of a driving direction for the vehicle, to recognize a roadway path by identifying a roadway edge. The image analysis is performed by an ECU for the vehicle which determines a predicted vehicle path and compares the roadway path to the predicted vehicle path. The ECU determines a vehicle roadway departure is occurring when the predicted vehicle path differs from the roadway path by a predetermined threshold, and then determines at least one corrective action to return the vehicle path to the roadway path. The ECU sends instructions to at least one other vehicle system to provide at least one corrective action Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 2 is a schematic illustration of a method of using the road departure protection feature of the present invention; and FIG. 3A-G are schematic illustrations of the vehicle applying the road departure protection feature of the present invention.

DETAILED DESCRIPTION

Figure 1:
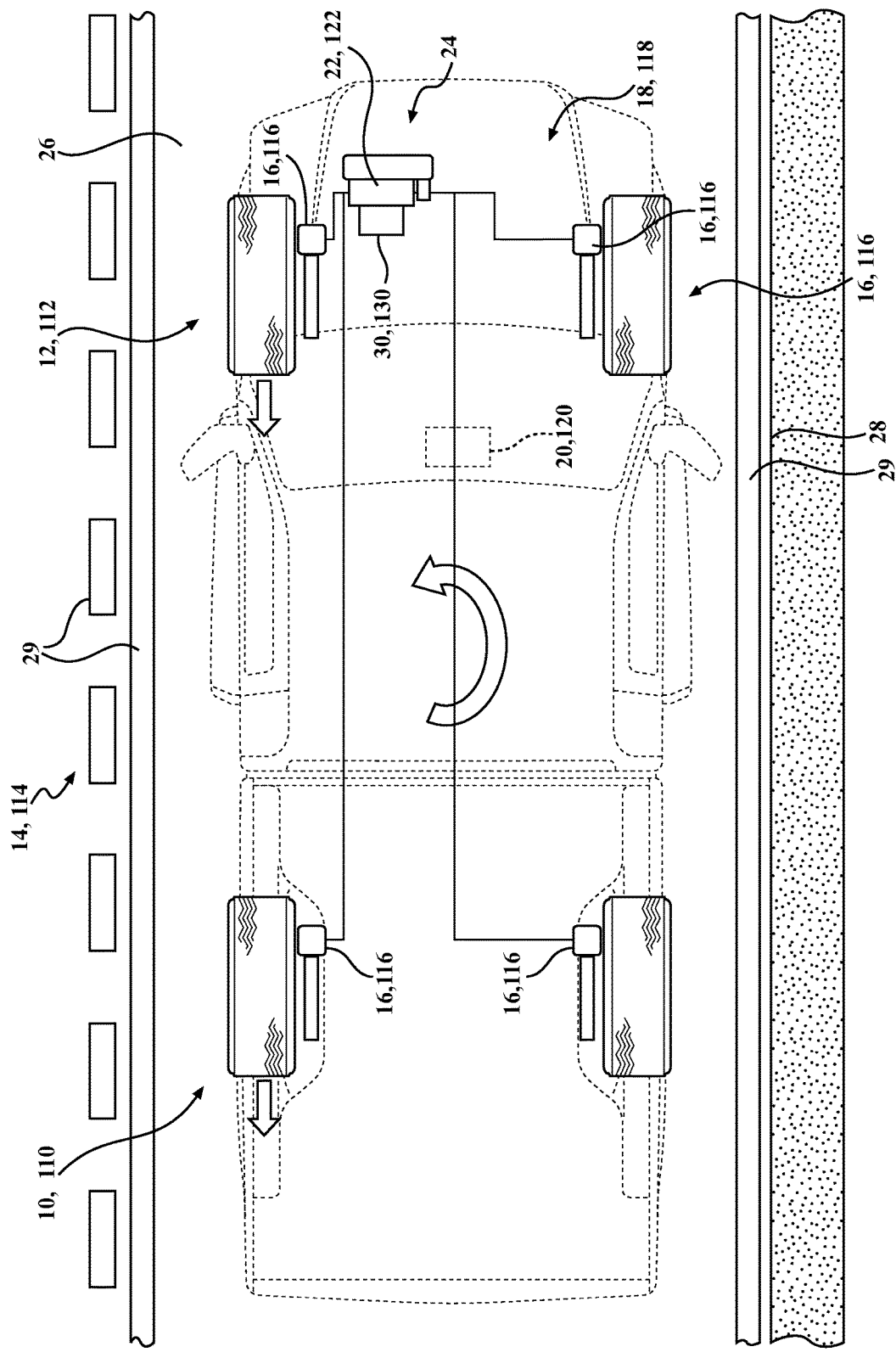
FIG. 1 is a schematic illustration of a vehicle having a road departure protection feature for a safety system of the present invention.

The following description is merely exemplary in nature and is in no way intended to limit the disclosure, its application, or uses. For purposes of clarity, the same reference numbers will be used in the drawings to identify similar elements. FIG. 1 illustrates a vehicle 10, 110 having a safety system 12, 112. The safety system 12, 112 includes a road departure protection (RDP) feature 14, 114. The RDP feature 14, 114 provides a method of preventing the vehicle's 10, 110 unintentional departure from the roadway without requiring the input of a driver.

The RDP feature 14, 114 may utilize information from various sensors 16, 116 and systems 18, 118 of the vehicle 10, 110, such as wheel speed sensors, inertial sensors, radar, light detection and ranging (LIDAR), camera 20, 120, etc. In addition, the RDP feature 14, 114 may utilize an electronic stability control system (ESC) 22, 122, and an electric power steering system (EPS) 24. An electronic control unit (ECU) 30, 130 for the vehicle 10 analyzes information from the various sensors and systems to detect road departure and determine a corrective action.

The RDP feature 14, 114 uses a trajectory control strategy to steer the vehicle 10, 110 back into a safe path when a road departure is detected. In cases where the vehicle 10, 110 has not "significantly" departed the roadway already, the trajectory controller aims to steer the vehicle 10, 110 back onto the roadway until the entire vehicle 10,110 is back on the roadway and the vehicle's trajectory is equivalent to the tangent of the road curve. In cases where the vehicle 10, 110 has already "significantly" departed the roadway, the trajectory controller aims to steer the vehicle 10, 110 back until the trajectory is equivalent to the tangent of the road curve, but not completely back onto the roadway. This is done to avoid potential collisions with oncoming traffic. However, for systems which have side and/or 360 degree sensing, this may not be necessary.

The system 12, 112 may make use of tire pressure monitoring sensors (TPMS), for detecting road surface roughness changes and confirming road departure. Other secondary sensor for detecting road surface roughness and/or changes, such as cameras, inertia measuring units (IMU) and wheel speed sensors (WSS) may be used. The system 12, 112 may also make use of global position system (GPS); ADAS map data; LIDAR and radar or other object sensing methods to detect other moving traffic participants and stationary objects to define the drivable roadway. The RDP feature 14, 114 can use active driver monitoring to tailor the RDP activation and intervention strategy, i.e. to suppress interventions in case of active driver engagement, or to provide earlier, and/or stronger interventions in case of driver distraction, drowsiness, impairment, etc.

The ECU 30, 130 may also determine a predicted vehicle path for comparison to the roadway path to detect a departure. Prediction of the vehicle path may include input from the sensors and systems mentioned above, including at least a steering angle sensor from the EPS 24. When the predicted vehicle path and the roadway path differ above a predetermined threshold, a roadway departure is detected. The predetermined threshold may vary according to current conditions of the vehicle, such as speed, steering angle, etc., and rate of change of the difference between the predicted vehicle path and the roadway path.

The ECU 30, 130 detects a departure and/or approaching departure of the vehicle from a road, e.g. by detecting a roadway edge, as described in detail below. Throughout the present description, reference to a roadway departure of the vehicle includes both a departure that has at least partially occurred as well as an impending departure of the vehicle from the roadway.

A secondary confirmation of the departure and/or impending departure may also be used to provide more robust detection due to the strong steering intervention that may be required to provide corrective action. The secondary confirmation may be performed by the ECU 30, 130 or reported to the ECU 30, 130 from another vehicle system, e.g. a lane departure warning system. Additionally, the ECU 30, 130 may be commonly used by other vehicle systems, or may separately provide analysis for the RDP feature 14, 114.

The ECU 30, 130 analyzes images from the camera 20, 120 to provide the primary confirmation of roadway departure for the RDP feature 14, 114. The camera 20, 120 is mounted to view the driving direction of the vehicle 10, 110. The actual roadway 26 is detected, including the roadway boundaries 28, e.g. the road edge. When an unintended departure from the roadway 26 by the vehicle 10, 110 is detected, the vehicle 10, 110 is automatically steered back into the roadway 26, or alternatively is automatically prevented from further departing the roadway 26. The vehicle 10, 110 does not need to leave the roadway 26 for the departure to be detected. The RDP feature 14, 114 may detect an impending departure of the vehicle 10, 110 from the roadway and correct the vehicle 10, 110 path prior to the departure occurring. Additionally, the RDP feature 14 may warn the driver. However, the RDP feature 14 will provide correction of the vehicle path in the absence of a reaction from the driver.

When the vehicle 10, 110 path is corrected by use of automotive steering, the automatic steering of the vehicle can be accomplished by: (1) the electronic brake system by way of the ESC 22, 122 by activating of the appropriate wheel brakes, (2) the EPS system 24 via a steering torque/force application, (3) by another autonomously controlled actuator, such as a rear steering actuator, and (4) by any combination of 1-3 above. In order to utilize the ESC 22, 122 for steering for the vehicle 10, the ESC 22 may provide a yaw torque through application of differential braking (shown by arrows in FIG. 1) to bias the vehicle 10 in the desired direction. Any type of EPS system 24 capable of applying a steering torque/force independent of driver input may be utilized.

The RDP feature 14, 114 may provide a specific trajectory control based upon the unique circumstances of the detected roadway departure (or impending roadway departure). The specific trajectory control for a situation may be to correct, or overcorrect, the vehicle path depending on the amount of departure which has occurred at the time of detection, the trajectory of the road, and the vehicle dynamics. The specific trajectory control to provide path correction may involve steering the vehicle 10, 110, in one of the manners described above, to a determined distance from the road edge. The corrective action by the RDP feature 14, 114 may provide correction while maintaining the vehicle 10 position within the current lane of travel along the roadway. An overcorrecting action may involve moving the vehicle 10, 110 to the side of the lane of travel that is farthest from the roadway edge 28 and then returning the vehicle 10, 110 to the center of the lane or to a predetermined distance from the roadway edge 28. That is, the action involves steering the vehicle 10, 110 away from the detected roadway edge 28 and then bringing the path of the vehicle 10, 110 back to a trajectory that is parallel to the roadway edge 28 (parallel to a tangent of a road curve).

Secondary confirmation of the roadway departure can be obtained via a measurement of the road surface roughness by additional sensor information such as that from IMU positioned on each side of the vehicle 10, WSS 16, 116, and/or the camera 20, 120. Road surface roughness may include repetitive variations in road surface, e.g. rumble strips, or may include recognition of a change in surface roughness, such as by one or more wheels contacting gravel alongside a paved road. Additional confirmation of the driving situation/condition of the vehicle 10 relative to the roadway 26 may be achieved by the use of additional sensors 16, 116 used by advanced driver assistance systems, such as a radar or LIDAR, or by other driver assistance systems, such as lane departure warning using lane markings 29.

The RDP feature 14, 114 may be used at a range of vehicle speeds, e.g. 55 km/h to 130 km/h, and on various types of roads, e.g. country roads and highways. Some systems may only operate under normal road conditions, while other systems which have additional sensors and systems for detecting and reacting to road departures may also operate under complex road conditions, i.e. construction zones and urban roads. The RDP feature 14, 114 can also be configured for use in left- or right-hand drive vehicles.

Other vehicle sensors and systems may also be used to provide secondary detection of roadway departure, increase the robustness of the primary and/or secondary detection of roadway departure, or provide additional consideration of a required intervention. In one instance, information from a tire pressure monitoring system can be used to detect and/or confirm roadway departure. In another instance, GPS and an ADAS map can be used to detect and/or confirm roadway departure. In yet another instance, a driver attention monitor can be used to alter a confidence level that vehicle steering intervention is required or not required by the RDP feature 14, 114. In such instances, the information from the additional systems is analyzed by the ECU 30, 130.

FIG. 2 illustrates one embodiment of a system architecture for a vehicle 10, 110 having the RDP feature 14, 114. The ECU 30, 130 uses and includes data processing of information such as raw sensor inputs, lane/road trajectories, roadway edge distance, roadway information qualities, vertical accelerations, etc. In addition, a road model 32, 132 may be used internally, which includes information about the roadway edges, data about the features of the roadside(s), road type, etc. The road data may be collected and determined from the sensor inputs and may also utilize information from a GPS and ADAS map system if available. The ECU 30, 132 uses the data processing information and the road model to provide the RDP feature 14, 114 by analyzing an image from the camera 20, 120 to recognize the roadway path 26 through identification of a roadway line or a roadway edge. The roadway path is compared to a predicted vehicle path, which is also determined by the ECU 30, 130. A vehicle roadway departure is determined when the predicted vehicle path differs from the detected roadway path by a predetermined threshold. The ECU 30, 130 also determines a corrective action(s) to return the vehicle path to the roadway path. The ECU 30, 130 sends a request 34, 134, to another vehicle system such as the ESC 22, 122 or the EPS 24 to provide the desired action.

In one embodiment, the safety system 12 with the RDP feature 14 may also utilize a stereo camera 20 for detection of the roadway boundaries 28 and estimation of the road surface roughness. Additionally, the RPD feature 14 may use scanning LIDAR sensing, for detection of roadway boundary, and side-facing sensors for free space measurement, confirmation of road edge, etc. Such sensors 16 could be any combination of the following: radar, LIDAR, ultrasonic sensors, and additional cameras. The RDP feature 14 may also make use of alternative actuators such as EPS and/or rear steer, as described above.

In another embodiment, the safety system 112 uses low-cost sensors and actuators, i.e. a mono-camera 120 and ESC 122, which are already standard equipment on many vehicles 110. The mono-camera 120 is used as the primary sensing device. In addition, the RDP feature 114 may have secondary confirmation of roadway 26 departures from sensors 116 such as an IMU and/or WSS, which may be necessary to prevent or reduce false activations and allow for stronger intervention levels. In this embodiment, the ESC 122, which is also typically already included on the vehicle 110, acts as an actuator to correct the vehicle 110 departure and return the vehicle 110 to the roadway 26 path. The ESC 122 is utilized due to the low cost, which provides a high take rate and benefit in the field. Other advantages of using ESC 122 as a steering/corrective actuator includes deceleration of the vehicle 110, which mitigates the effect of any collision that may happen in the event the vehicle 110 still departs the roadway.

Figure 3G:
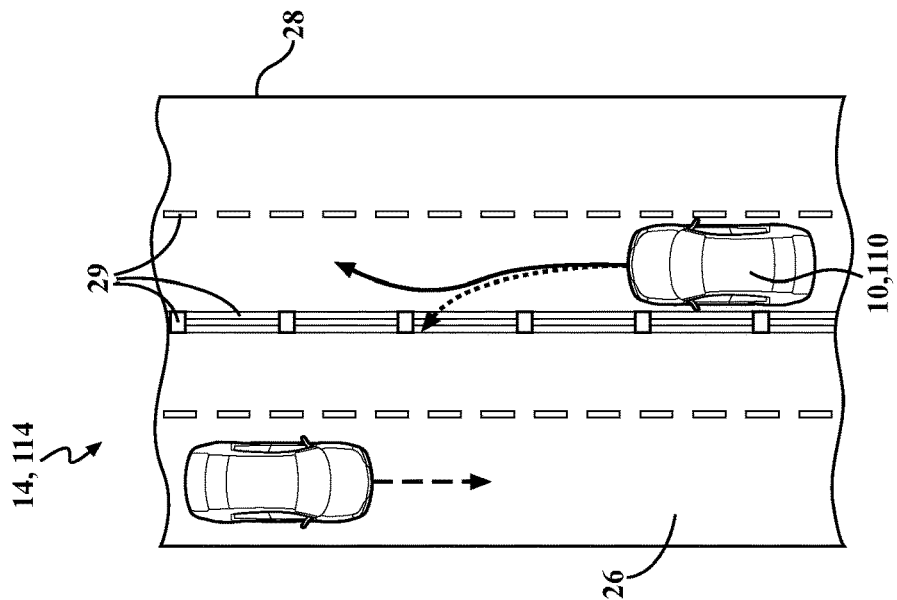

FIGS. 3A-G illustrate a plurality of situations where a vehicle 10, 110 road and roadway departure is detected by the RDP feature 14, 114. An uncorrected roadway departure course shown by a dashed arrow. The RDP feature 14, 114 corrects the vehicle 10, 110 path to keep the vehicle 10, 110 on the roadway 26, with the corrected path shown by solid arrow. FIG. 3A is an example of a correction for a vehicle 10, 110 traveling down a straight road where the side of the road does not have a road line 29 to mark the edge of the road. The RDP feature 14, 114 identifies the road edge 28 to identify the roadway 26. FIG. 3B is an example of a correction for a vehicle 10, 110 traveling down a straight road where the side of the road has a road line 29 to mark the edge of the road. The RDP feature 14, 114 uses the road edge 28 to identify the roadway 26. Therefore, regardless of whether a road line 29 is present, as shown in FIG. 3B, or absent, as shown in FIG. 3C, the RDP feature 14, 114 will provide the necessary corrective action to maintain the vehicle 10, 110 on the roadway 26. Additionally, if the vehicle 10, 110 is equipped with a lane departure warning, this could be used as secondary confirmation for the RDP feature 14, 114. FIG. 3C is an example of a correction for the vehicle 10, 110 traveling down a straight road where the side of the road does not have a road line 29 to mark the edge 28 of the road. The RDP feature 14, 114 identifies the road edge 28 to identify the roadway 26. In FIG. 3C, objects such as bushes, trees, parked cars, guardrails, etc. are located along the roadside, which help identify the roadway path. When the road line 29 is present, as in FIG. 3C, the road line 29 may also be used to provide secondary confirmation of the road edge 28 for the RDP feature 14, 114. Additionally, if the vehicle 10, 110 is equipped with a lane departure warning, this could be used as secondary confirmation for the RDP feature 14, 114.

FIG. 3D is another example of the vehicle 10, 110 traveling down a straight road where the side of the road is marked (or unmarked). However, the road shown is one where vehicles 10, 110 are driven on the left side of the road. The vehicle 10, 110 is a right-hand drive vehicle 10, 110. The RDP feature 14, 114 is programmed to make adjustments necessary to such a driving situation.

Figure 3F:
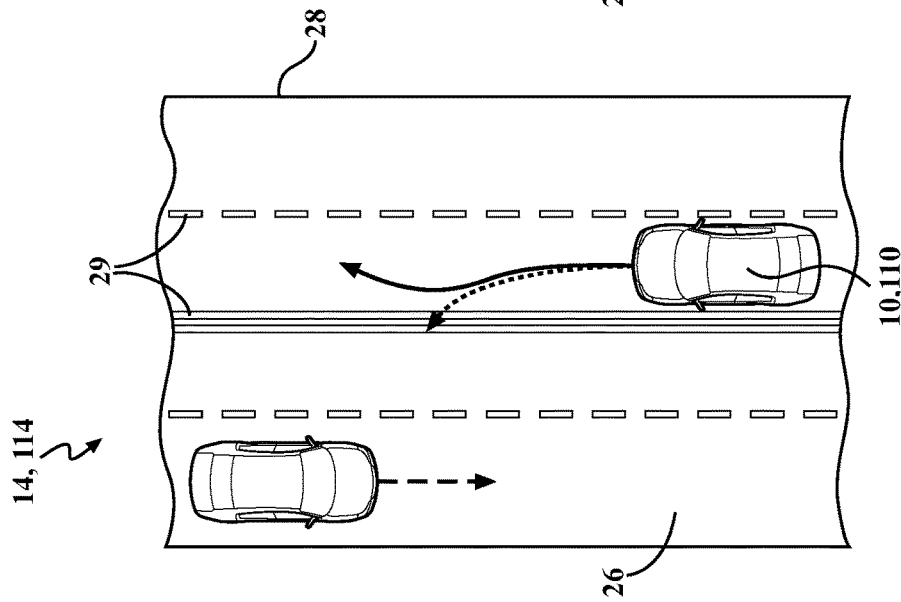
Figure 3E:
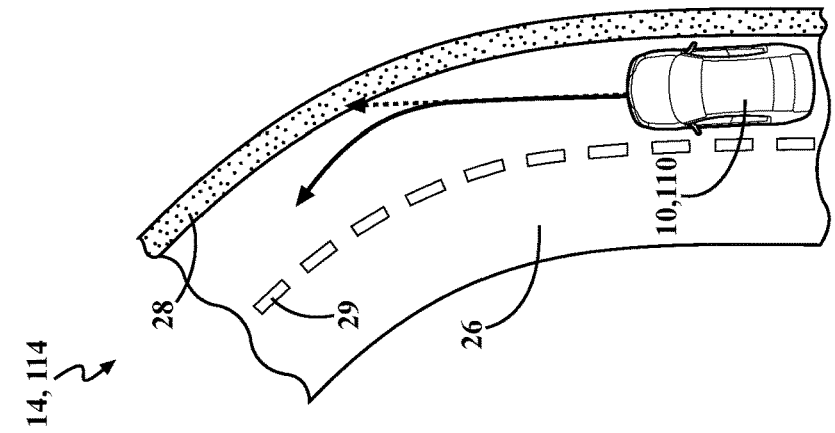

FIG. 3E is an example of a correction for a vehicle 10, 110 traveling down a curved road, where the side of the road does not have a road line 29 to mark the edge 28 of the road. The RDP feature 14, 114 identifies the road edge 28 to identify the roadway 26. The RDP feature 14, 114 provides steering to the vehicle 10, 110 to maintain the vehicle path on the roadway around the identified curve, illustrated by the solid arrow. Sensors 16, 116, such as wheel speed sensors and independent acceleration sensors, can be used to determine vehicle trajectory and confirm roadway departure.

FIG. 3F illustrates an example of a correction for a vehicle 10, 110 traveling down a straight road where the vehicle 10, 110 is departing from the marked lane into oncoming traffic. The RDP feature 14, 114 identifies the lane marking 29 (white or yellow, solid or double lines) to identify the proper lane for the vehicle 10, 110 and keeps the vehicle 10, 110 in the marked lane. The RDP feature 14, 114 may utilize other systems such as a lane departure warning to detect the departure in this type of situation. Oncoming traffic may also be used as objects to assist/confirm lane detection and departure. Similar to FIG. 3F, FIG. 3G illustrates an example of a correction for the vehicle 10, 110 traveling down a straight road where the vehicle 10, 110 is departing from the marked lane 29 into oncoming traffic. However, the road in FIG. 3G also has reflectors, barrels, buttons, etc., to mark the lane as an additional road feature 29 that can be used to detect the lane departure.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A safety system for a vehicle providing a road departure protection feature comprising:
   a camera, mounted to the vehicle to provide a view of a driving direction of the vehicle;
   an electronic control unit connected to the camera, wherein the electronic control unit includes instructions for:
   analyzing an image from the camera to recognize a roadway path by identifying a roadway edge and estimate a road surface roughness value;
   determining a predicted vehicle path;
   comparing the roadway path to the predicted vehicle path; and
   determining a vehicle road departure when the predicted vehicle path differs from the roadway path by a predetermined threshold;
   determining at least one corrective action to return the vehicle path to the roadway path; and applying the at least one corrective action with at least an electronic stability control system; wherein the electronic control unit instructions for applying at least one corrective action further comprises: providing a steering action with an electronic power steering system; providing a steering action with a rear steering system; and using any combination of the electronic stability system, the electronic power steering system and the rear steering system; wherein the at least one corrective action is complete when a trajectory of the vehicle is parallel with the roadway edge; and wherein the electronic control unit instructions for applying at least one corrective action further comprises changing the trajectory away from the roadway edge and further onto the roadway path prior to changing the trajectory of the vehicle to parallel with the roadway edge.

2. The safety system of claim 1, wherein the electronic control unit further includes instructions for:
  determining the roadway path using at least one additional source for detecting a roadway path;
  comparing the roadway path determined by the at least one additional source to the predicted vehicle path; and
  providing a secondary confirmation of roadway departure.

3. The safety system of claim 2, wherein the at least one additional source includes at least one of inertial measuring units, wheel speed sensors, another camera, side-facing sensors, ultrasonic sensors, radar, LIDAR.

4. The safety system of claim 1, wherein the camera is a stereo camera.

* * * * *